(12) United States Patent
Li et al.

(10) Patent No.: US 6,917,760 B2
(45) Date of Patent: Jul. 12, 2005

(54) WIDE PASSBAND OPTICAL INTERLEAVER

(75) Inventors: Yuan P. Li, Duluth, GA (US); Yan Wang, Norcross, GA (US); Robert John Shine, Jr., San Jose, CA (US); Kevin Sullivan, Fremont, CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 441 days.

(21) Appl. No.: 10/039,242

(22) Filed: Dec. 31, 2001

(65) Prior Publication Data

US 2003/0123878 A1 Jul. 3, 2003

(Under 37 CFR 1.47)

(51) Int. Cl.[7] .............................................. H04B 10/00
(52) U.S. Cl. ......................................... 398/82; 398/48
(58) Field of Search ............................ 398/48, 49, 50, 398/51, 80, 82

(56) References Cited

U.S. PATENT DOCUMENTS

| | | | |
|---|---|---|---|
| 5,596,661 A | 1/1997 | Henry et al. ................... 385/24 |
| 5,694,233 A | 12/1997 | Wu et al. ..................... 359/117 |
| 5,809,190 A | 9/1998 | Chen ........................... 385/43 |
| 5,852,505 A * | 12/1998 | Li .............................. 398/58 |
| 6,169,626 B1 | 1/2001 | Chen et al. ..................... 385/2 |
| 6,212,313 B1 | 4/2001 | Li ............................. 385/15 |
| 6,215,923 B1 | 4/2001 | Li ............................. 385/24 |
| 6,335,830 B1 * | 1/2002 | Chang et al. ............... 359/498 |
| 6,614,573 B1 * | 9/2003 | Cao ........................... 359/246 |
| 6,754,411 B2 * | 6/2004 | Ahmadvand et al. ......... 385/24 |
| 2002/0054407 A1 * | 5/2002 | Yamada et al. ............. 359/128 |

OTHER PUBLICATIONS

Joseph C. Chon et al., "High Capacity and High Speed DWDM and NWDM Optical Devices for Telecom and Datacom Applications," WaveSplitter TechnolOgies Inc., n.d.

Jerry Bautista et al., "Untangling the Wavelength Web," Photonics Reports, Feb. 2001. www.photonics.com/Spectra/Features/feb01/repUntagling.html.

Fiber Optics & Communication. DWDM Interleaver Router—50GHz. BFi OPTILAS—s440—Passive Components–DWDM Interleaver Router. www.bfi.avnet.com/uk/a002/s440/440p002.htm.

* cited by examiner

*Primary Examiner*—Jason Chan
*Assistant Examiner*—Christina Y Leung
(74) *Attorney, Agent, or Firm*—Mayer Fortkort & Williams, PC; Stuart H. Mayer, Esq.

(57) ABSTRACT

A method and apparatus is provided for reformatting or interleaving a WDM signal that includes a plurality of optical channels having a first bandwidth and a first channel spacing. The method begins by receiving the WDM signal and dividing it into first and second subsets of optical channels each having a second channel spacing. Next, the first subset of optical channels are divided into third and fourth subsets of optical channels each having a third channel spacing. In addition, the second subset of optical channels is divided into fifth and sixth subsets of optical channels each having a fourth channel spacing. The third and fifth subsets of optical channels are combined to generate a first output WDM signal, while the fourth and sixth subsets of optical channels are combined to generate a second output WDM signal.

28 Claims, 4 Drawing Sheets

WIDE PASSBAND OPTICAL INTERLEAVER

FIELD OF THE INVENTION

The present invention relates generally to WDM and DWDM communication systems, and more generally to an optical interleaver employed in such systems.

BACKGROUND OF THE INVENTION

Optical wavelength division multiplexing (WDM) and dense wavelength division multiplexing (DWDM) have gradually become the standard backbone networks for fiber optic communication systems. WDM and DWDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM and DWDM technology.

One approach to increasing fiber optic capacity is to use more closely spaced channels. For example, at one point in time, 200 GHz spacing was common for optical channels. At that time optical components were designed to operate on 200 GHz spaced channels. As the state of the art improved, 100 GHz spacing was used for optical channels. Optical components were then designed to operate on 100 GHz spaced channels and devices designed to operate on 200 GHz spaced channels had to be replaced of modified to operate on the 100 GHz spaced channels. This upgrade requirement can be very expensive for parties with an extensive amount of fiber optic equipment that is already deployed.

An optical device that can be used for interfacing between different channel spacing schemes is known as an interleaver/deinterleaver, which is essentially an optical router that allows systems designed for operation at a wide channel spacing to be extended to systems designed for narrow channel spacings. In its simplest form, an interleaver combines two sets of channels into one densely packed set with half the channel spacing. Interleavers/deinterleavers are also used for other purposes, such as to add/drop channels at a node in such a way that one interleaver output adds/drops local channels while the other interleaver output forwards express channels to another node.

Interleavers that can provide a series of channels with wide passbands are important for increasing the spectral efficiency of optical communication systems. In particular, it is important to increase the ratio of the interleaver's passband width to the channel spacing. Unfortunately, when the passband of a conventional interleaver is increased, the fall-off (i.e., the slope of the passband sidewalls) also increases.

Accordingly, it would be desirable to provide an improved optical interleaver that has an increased passband width relative to its channel spacing.

SUMMARY OF THE INVENTION

In accordance with the present invention, a method and apparatus are provided for reformatting a WDM signal that includes a plurality of optical channels having a first bandwidth and a first channel spacing. An important advantage of the present invention is that it provides an interleaver arrangement in which the ratio of the passband width relative to the channel spacing is approximately doubled.

The method begins by receiving the WDM signal and dividing it into first and second subsets of optical channels each having a second channel spacing. Next, the first subset of optical channels are divided into third and fourth subsets of optical channels each having a third channel spacing. In addition, the second subset of optical channels is divided into fifth and sixth subsets of optical channels each having a fourth channel spacing. The third and fifth subsets of optical channels are combined to generate a first output WDM signal, while the fourth and sixth subsets of optical channels are combined to generate a second output WDM signal.

In accordance with one aspect of the invention, the first and second subsets of optical channels are even and odd channels, respectively, of the plurality of optical channels of the WDM signal. Likewise, the third and fourth subsets of optical channels may be even and odd channels, respectively, of the first subset of optical channels, whereas the fifth and six subsets of optical channels may be even and odd channels, respectively, of the second subset of optical channels.

In accordance with another aspect of the invention, the second channel spacing is approximately equal to twice the first channel spacing. Also, the third and fourth channel spacings are approximately equal to twice the second channel spacing.

In accordance with another aspect of the invention, an interleaver arrangement is provided. The arrangement includes an input interleaver having an input port and at least a pair of output ports and a second interleaver having a second input port coupled to a first of the two output ports of the input interleaver. The second interleaver also has at least a second pair of output ports. The arrangement also includes a third interleaver having a third input port coupled to a second of the two output ports of the input interleaver. The third interleaver also has at least a third pair of output ports. A first optical combiner has a first combiner input port coupled to a first of the second pair of output ports of the second interleaver. The first optical combiner also has a second combiner input port coupled to a first of the third pair of output ports of the third interleaver. A second optical combiner has third and fourth combiner input ports and a second combiner output port. The third combiner input port is coupled to a second of the second pair of output ports of the second interleaver. The fourth combiner input port is coupled to a second of the third pair of output ports of the third interleaver.

In accordance with another aspect of the invention, the input interleaver is configured to receive on the input port a WDM signal that includes a plurality of optical channels having a first bandwidth and a first channel spacing and to divide the WDM signal into first and second subsets of optical channels each having a second channel spacing. Likewise, the second interleaver may be configured to receive on the second input port the first subset of optical channels and to divide the first subset of optical channels into third and fourth subsets of optical channels each having a third channel spacing. The third interleaver may be configured to receive on the third input port the second subset of optical channels and to divide the second subset of optical channels into fifth and sixth subsets of optical channels each having a fourth channel spacing.

In accordance with yet another aspect of the invention, the first optical combiner is configured to combine the third and fifth subsets of optical channels to generate a first output WDM signal and the second optical combiner may be configured to combine the fourth and sixth subsets of optical channels to generate a second output WDM signal.

In accordance with another aspect of the invention, the first and second subsets of optical channels are even and odd channels, respectively, of the plurality of optical channels of the WDM signal. Additionally, the third and fourth subsets of optical channels may be even and odd channels, respectively, of the first subset of optical channels.

DETAILED DESCRIPTION

Figure 1:
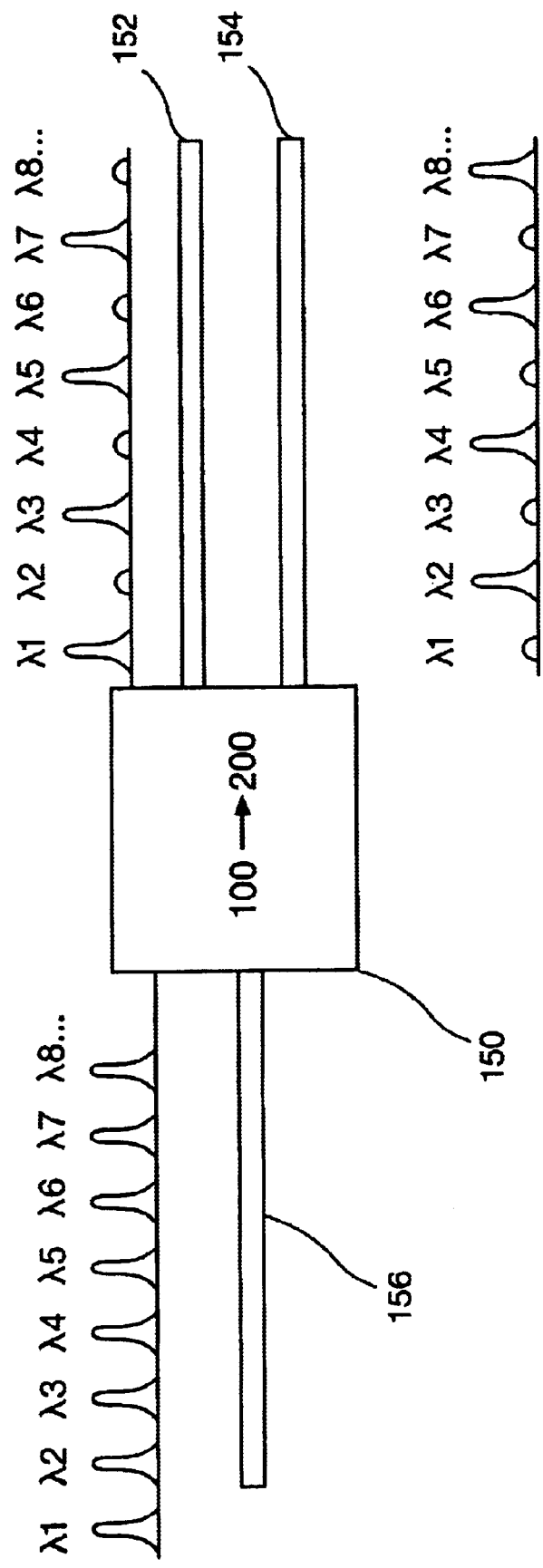
FIG. 1 illustrates the functionality of a conventional single-stage optical interleaver.

FIG. 1 illustrates the functionality of a conventional single-stage 1×2 optical interleaver. As shown, interleaver 150 receives on input port 156 a WDM optical signal having a channel spacing of 100 GHz and converts it two signals each having a channel spacing of 200 GHz, which are directed to output ports 152 and 154. While the device shown in FIG. 1 can function as both an interleaver and a deinterleaver, it will generally be referred to simply as an interleaver. The deinterleaver separates a subsets of channels. The interleaver mixes subsets of channels. In this example, when functioning as a deinterleaver, the odd channels have a 200 GHz spacing and the even channels have a 200 GHz spacing. When functioning as an interleaver, the even and odd channels having 200 GHz spacing are combined into a signal stream having 100 GHz signal spacing. Similar interleaving can be provided to convert between 50 GHz spaced channels and 100 GHz spaced channels, as well as between other sets of channel spacing schemes.

The conversion process depicted in FIG. 1 is useful, for example, to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

As described in more detail below, the present invention concatenates three or more interleavers to provide an interleaver arrangement that not only converts between channel schemes having different channel spacings, but which also converts between channel schemes having different passbands. The individual interleavers, such as intereaver 100, that are employed in the invention may be conventional interleavers that are commercially available. While conventional interleavers may be based on a variety of different technologies, all operate on the general principal of an interferometric overlap of two optical beams. The interference produces a periodic repeating output as different integral multiples of wavelengths pass through the device. The desired channel spacing of the device is set by controlling the fringe pattern that is produced.

In some embodiments of the invention the individual interleavers that are employed are based on Mach-Zehnder interferometers or Fourier filters, which advantageously can be produced in the form of a planar lightguide circuit. An example of an interleaver employing a Fourier filter is a nonlinear Fourier Filter Flat-top ($F^3T$) interleaver such as the WaveProcessor™ Interleaver available from WaveSplitter Technologies. Of course, the invention may also employ interleavers based on more conventional technologies such as the interleaver depicted in FIG. 2, which is based on a birefringent crystal.

Figure 2:
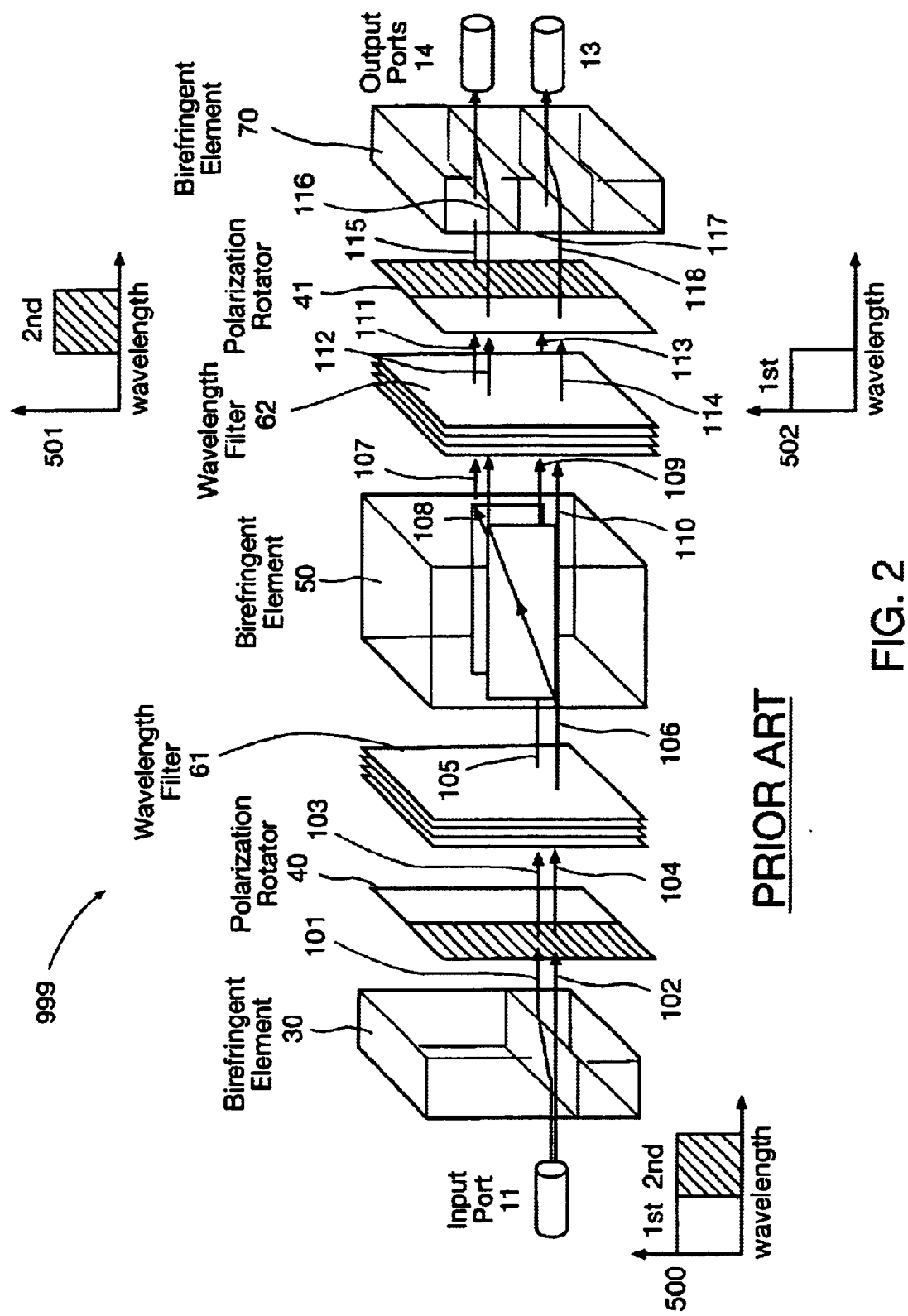
FIG. 2 shows an example of a conventional interleaver that is based on a birefringent crystal.

FIG. 2 shows a conventional interleaver that is shown in U.S. Pat. Nos. 5,694,233 and 6,215,923 and which employs a birefringent crystal. As shown, a WDM signal 500 containing two different channels 501 and 502 enters interleaver 999 at an input port 11. A first birefringent element 30 spatially separates WDM signal 500 into horizontal and vertically polarized components 101 and 102 by a horizontal walk-off. Component signals 101 and 102 both carry the full frequency spectrum of the WDM signal 500.

Components 101 and 102 are coupled to a polarization rotator 40. The rotator 40 selectively rotates the polarization state of either signal 101 or 102 by a predefined amount. By way of example, in FIG. 2 signal 102 is rotated by 90 degrees so that signals 103 and 104 exiting rotator 40 are both horizontally polarized when they enter a wavelength filter 61.

Wavelength filter 61 selectively rotates the polarization of wavelengths in either the first or second channel to produce filtered signals 105 and 106. For example wavelength filter 61 rotates wavelengths in the first channel 501 by 90 degrees but does not rotate wavelengths in the second channel 502 at all.

The filtered signals 105 and 106 enter a second birefringent element 50 that vertically walks off the first channel into beams 107 and 108. The second channel forms beams 109 and 110.

A second wavelength filter 62 then selectively rotates the polarizations of signals 107 and 108 but not signals 109 and 110, thereby producing signals 111, 112, 113 and 114, having polarizations that are parallel each other. A second polarization rotator 41 then rotates the polarizations of signals 111 and 113, but not 112 and 114. The resulting signals 115, 116, 117, and 118 then enter a third birefringent element 70. Note that second wavelength filter 62 may alternatively be replaced by a polarization rotator 41 suitably configured to rotate the polarizations of signals 111 and 113 but not 112 and 114.

Third birefringent element 70 combines signals 115 and 116, into the first channel, which is coupled to output port 14. Birefringent element 70 also combines signals 117 and 118 into the second channel, which is coupled into output port 13.

As previously mentioned, for many applications it is important to have an interleaver that has a wide passband. Generally, when the passband of a conventional interleaver is increased, the fall-off (i.e., the slope of the passband sidewalls) also increases. The present inventors have found that a series of interleavers can be cascaded in such a way that the passband is increased without a commensurate increase in the falloff of the passband. In particular, as will be depicted below, if three interleavers are employed, the present invention can increase the passband while only increasing the falloff by the amount imparted by the first input interleaver.

Figure 3:
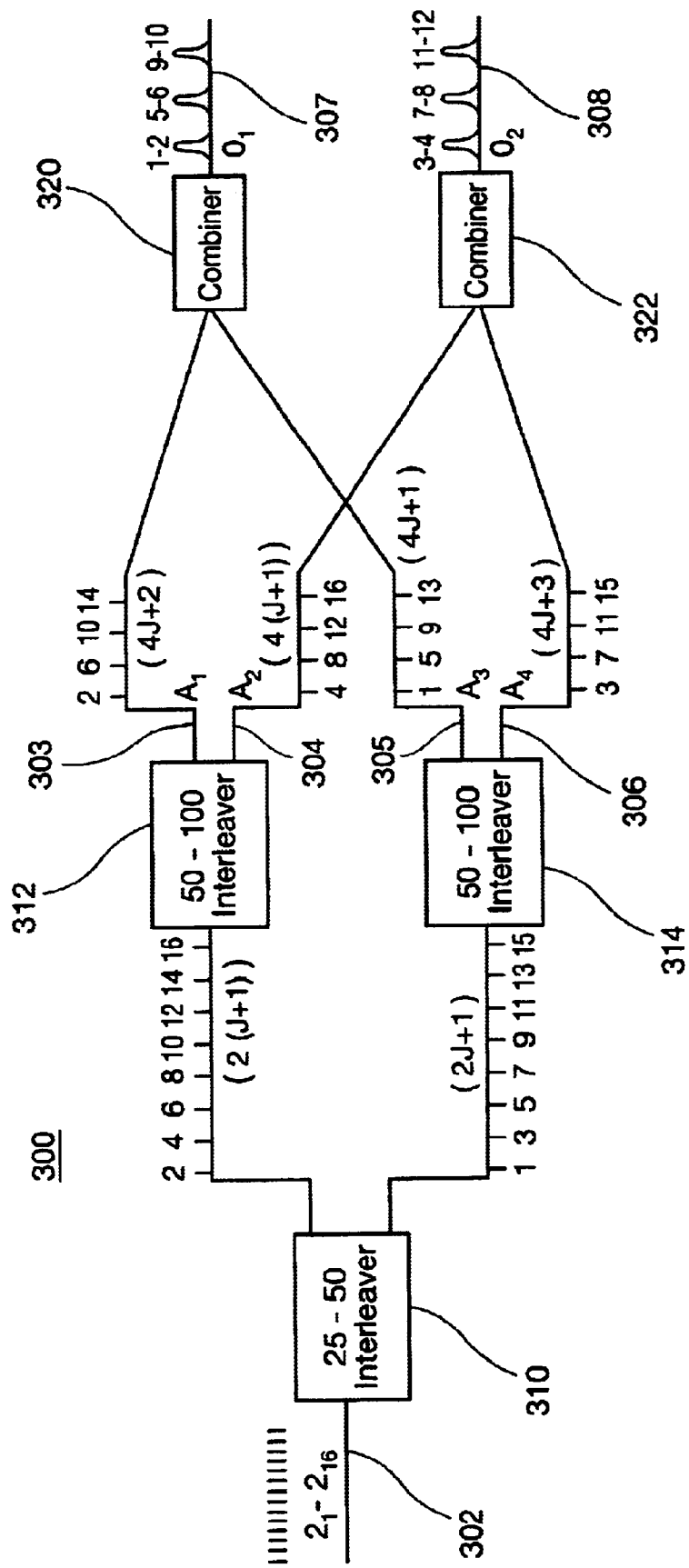
FIG. 3 is a block diagram of one embodiment of an optical interleaver arrangement constructed in accordance with the present invention.

FIG. 3 is a block diagram of an optical interleaver arrangement 300 constructed in accordance with the present invention for converting an optical channel scheme having 25 GHz spacing to an optical channel scheme having 50 GHz spacing and twice the passband of the original optical channel scheme. In general, interleaver arrangement 300 includes interleaver 310 to convert from one set of 25 GHz spaced channels to two sets of 50 GHz spaced channels. Interleaver arrangement 300 also includes two interleavers 312 and 314, each of which convert one of the sets of 50 GHz spaced channels to two sets of 100 GHz spaced channels. Individual interleavers 310, 312 and 314 may be, for example, any conventional interleavers based on the aforementioned technologies. Interleaver arrangement 300 allows devices designed for 25 GHz spaced channels to interact with devices or networks designed for 50 GHz spaced channels.

In operation, optical fiber 302 carries a set of optical channels $\lambda_1$ having 25 GHz spacing. Interleaver arrangement 300 separates the set of optical channels into sets of even (2(j+1)) and odd (2j+1) channels. The even channels are input to interleaver 312 and the odd channels are input to interleaver 314. The even and the odd channels have 50 GHz spacing.

Interleavers 312 and 314 operate to further separate the set of optical channels. Conceptually, interleaver 312 and 314 operate on the respective 50 GHz spaced channels to separate the input channels into "even" and "odd" channels. The sets of channels output by interleavers 312 and 314 have 100 GHz spacing. Interleaver 312 separates the even channels into two sets of channels (4J+2) and 4(J+1) output by optical fibers 303 and 304, respectively. Interleaver 314 separates the odd channels into two sets of channels (4J+1) and (4J+3) output by optical fibers 305 and 306, respectively. The four sets of channels output by interleavers 312 and 314 are 100 GHz spaced channels.

The set of channels output by interleaver 312 on optical fiber 303 and the set of channels output by interleaver 314 on optical fiber 305 and are input to a first combiner 320, which adds the two sets of channels. Likewise, the set of channels output by interleaver 312 on optical fiber 304 and the set of channels output by interleaver 314 on optical fiber 306 and are input to a second combiner 322, which also adds the two sets of channels. That is, combiner 320 adds channels (4J+2) and channels (4J+1), while combiner 322 adds channels 4(J+1) and (4J+3). First and second combiners 320 and 322 each may be, for example, a Y-branch or a Fourier filter.

Because combiner 320 adds adjacent channels (4J+2) and (4J+1), the resulting channels output by combiner 320 on optical fiber will have twice the passband of the set of optical channels initially received by interleaver 310. Similarly, the channels output by combiner 322 will also have twice the passband of the set of optical channels initially received by interleaver 310. Moreover, the channel spacing of the sets of channels output by combiners 320 and 322 on optical fibers 307 and 308 is 50 GHz. That is, the channel spacing is equal to the spacing that was achieved by the first interleaver 310.

Figure 4:
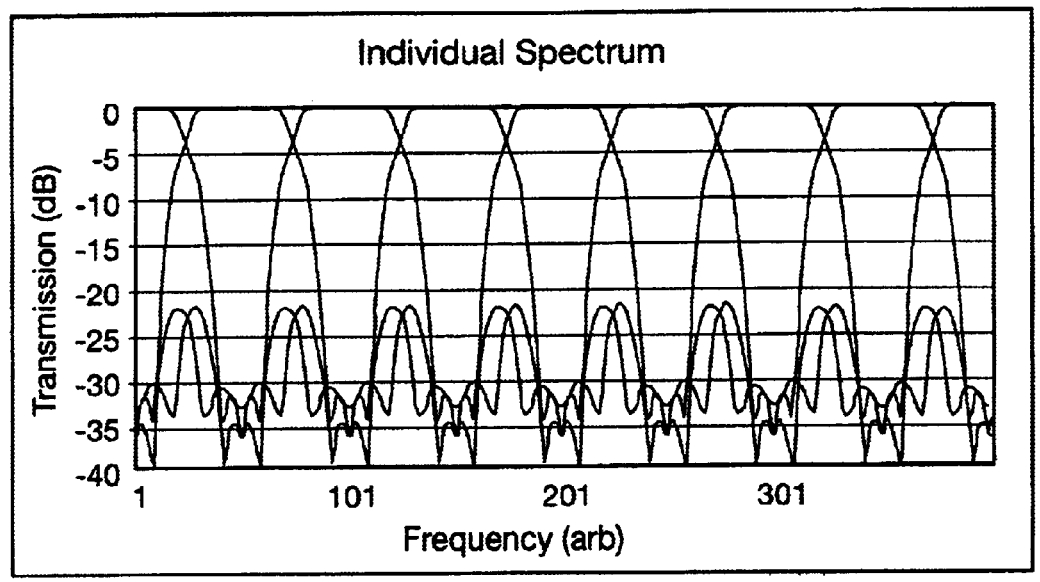
FIGS. 4 and 5 shows the results of a simulation that was performed in connection with the interleaver arrangement shown in FIG. 3.
Figure 5:
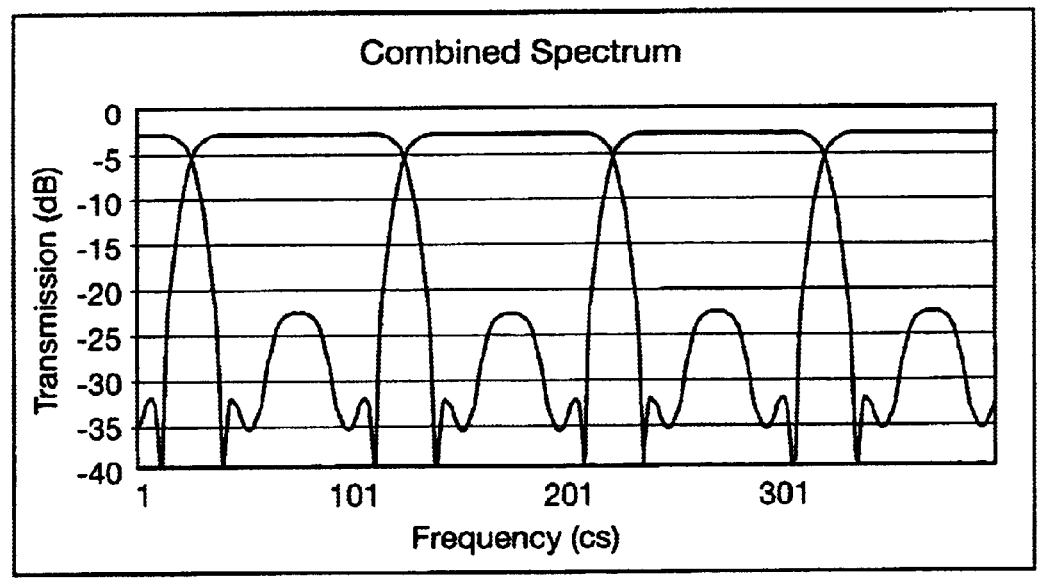

One important advantage of the present invention is that the passband of the output signal is increased without increasing the fall-off as much as a conventional interleaver arrangement that would otherwise be used to increase the passband of the channels. For example, FIGS. 4 and 5 shows the results of a simulation that was performed in connection with the interleaver arrangement 300 shown in FIG. 3 in which the individual interleavers employ Fourier filters. In FIG. 4, the spectra generated on the individual output ports 303–306 of interleavers 312 and 314 are shown. In FIG. 5, the spectra generated on the outputs 307 and 308 of combiners 320 and 322 are shown. As seen in FIG. 5, the passband and the channel spacing have increased by almost a factor of two.

In some embodiments of the invention the inventive interleaving arrangement may be formed on a single planar light-guide circuit. Alternatively, the inventive interleaving arrangement may be formed from discrete components.

While the interleaving arrangement shown in FIG. 3 has been described as performing a deinterleaving process, those of ordinary skill in the art will recognize that it can also be used in reverse to perform an interleaving process. In this regard it should be noted because the device is operational in a reciprocal manner, the terms input port and output port as used herein in connection with FIG. 3 are not limited to ports that transmit a WDM signal or channel in a single direction relative to the interleaver arrangement. In other words, when a WDM signal enters the arrangement from any so-called output port, this output port serves as an input port, and similarly, any so-called input port can equally serve as an output port.

One of ordinary skill in the art will also recognize that the present invention is not limited to the use of 1×2 interleavers such as shown in the figures and described above. For example, the principals of the present invention may be readily extended to an interleaver arrangement employing 1×4 interleavers or other interleavers having any number of output ports. Moreover, the inventive arrangement may be cascaded with additional interleavers and combiners to further increase the channel spacing and passband of the resulting output WDM signals.

What is claimed is:

1. A method of reformatting a WDM signal that includes a plurality of optical channels having a first bandwidth and a first channel spacing, said method comprising the steps of:
   receiving the WDM signal;
   dividing the WDM signal into first and second subsets of optical channels each having a second channel spacing;
   dividing the first subset of optical channels into third and fourth subsets of optical channels each having a third channel spacing;
   dividing the second subset of optical channels into fifth and sixth subsets of optical channels each having a fourth channel spacing;
   combining said third and said fifth subsets of optical channels to generate a first output WDM signal;
   combining said fourth and said sixth subsets of optical channels to generate a second output WDM signal.

2. The method of claim 1 wherein said first and second subsets of optical channels are even and odd channels, respectively, of the plurality of optical channels of the WDM signal.

3. The method of claim 2 wherein said third and fourth subsets of optical channels are even and odd channels, respectively, of the first subset of optical channels.

4. The method of claim 3 wherein said fifth and six subsets of optical channels are even and odd channels, respectively, of the second subset of optical channels.

5. The method of claim 4 wherein said second channel spacing is approximately equal to twice said first channel spacing.

6. The method of claim 5 wherein said third and fourth channel spacings are approximately equal to twice said second channel spacing.

7. The method of claim 6 wherein said first output WDM signal has a fifth channel spacing approximately equal to said second channel spacing.

8. The method of claim 6 wherein said first and second output WDM signals have a fifth channel spacing approximately equal to said second channel spacing.

9. The method of claim 8 wherein said first and second output WDM signals include a plurality of optical channels having a second bandwidth that is approximately equal to twice said first bandwidth of the WDM signal.

10. The method of claim 1 wherein said second channel spacing is approximately equal to twice said first channel spacing.

11. The method of claim 1 wherein said first output WDM signal has a fifth channel spacing approximately equal to said second channel spacing.

12. The method of claim 1 wherein said first and second output WDM signals have a fifth channel spacing approximately equal to said second channel spacing.

13. The method of claim 1 wherein said first and second output WDM signals include a plurality of optical channels having a second bandwidth that is greater than said first bandwidth of the WDM signal.

14. An interleaver arrangement, comprising:
   an input interleaver having an input port and at least a pair of output ports;
   a second interleaver having a second input port coupled to a first of the two output ports of the input interleaver and having at least a second pair of output ports;
   a third interleaver having a third input port coupled to a second of the two output ports of the input interleaver and having at least a third pair of output ports;
   a first optical combiner having first and second combiner input ports and a first combiner output port, said first combiner input port coupled to a first of the second pair of output ports of the second interleaver, said second combiner input port coupled to a first of the third pair of output ports of the third interleaver;
   a second optical combiner having a third and fourth combiner input ports and a second combiner output port, said third combiner input port coupled to a second of the second pair of output ports of the second interleaver and said fourth combiner input port coupled to a second of the third pair of output ports of the third interleaver.

15. The interleaver arrangement of claim 14 wherein said input interleaver is configured to receive on the input port a WDM signal that includes a plurality of optical channels having a first bandwidth and a first channel spacing and to divide the WDM signal into first and second subsets of optical channels each having a second channel spacing.

16. The interleaver arrangement of claim 15 wherein said second interleaver is configured to receive on the second input port said first subset of optical channels and to divide the first subset of optical channels into third and fourth subsets of optical channels each having a third channel spacing.

17. The interleaver arrangement of claim 16 wherein said third interleaver is configured to receive on the third input port said second subset of optical channels and to divide the second subset of optical channels into fifth and sixth subsets of optical channels each having a fourth channel spacing.

18. The interleaver arrangement of claim 17 wherein said first optical combiner is configured to combine said third and said fifth subsets of optical channels to generate a first output WDM signal and said second optical combiner is configured to combine said fourth and said sixth subsets of optical channels to generate a second output WDM signal.

19. The interleaver arrangement of claim 18 wherein said first output WDM signal has a fifth channel spacing approximately equal to said second channel spacing.

20. The interleaver arrangement of claim 18 wherein said first and second output WDM signals have a fifth channel spacing approximately equal to said second channel spacing.

21. The interleaver arrangement of claim 18 wherein said first and second output WDM signals include a plurality of optical channels having a second bandwidth that is greater than said first bandwidth of the WDM signal.

22. The interleaver arrangement of claim 18 wherein said first and second output WDM signals include a plurality of optical channels having a second bandwidth that is approximately equal to twice said first bandwidth of the WDM signal.

23. The interleaver arrangement of claim 17 wherein said fifth and six subsets of optical channels are even and odd channels, respectively, of the second subset of optical channels.

24. The interleaver arrangement of claim 17 wherein said third and fourth channel spacings are approximately equal to twice said second channel spacing.

25. The interleaver arrangement of claim 16 wherein said first and second subsets of optical channels are even and odd channels, respectively, of the plurality of optical channels of the WDM signal.

26. The interleaver arrangement of claim 25 wherein said third and fourth subsets of optical channels are even and odd channels, respectively, of the first subset of optical channels.

27. The interleaver arrangement of claim 15 wherein said first and second subsets of optical channels are even and odd channels, respectively, of the plurality of optical channels of the WDM signal.

28. The interleaver arrangement of claim 15 wherein said second channel spacing is approximately equal to twice said first channel spacing.

* * * * *

UNITED STATES PATENT AND TRADEMARK OFFICE
CERTIFICATE OF CORRECTION

PATENT NO. : 6,917,760 B2
DATED : July 12, 2005
INVENTOR(S) : Yuan P. Li et al.

It is certified that error appears in the above-identified patent and that said Letters Patent is hereby corrected as shown below:

Column 1,
Line 30, after "replaced", change "of" to -- or --.

Column 3,
Line 33, after "separates", delete "a".

Column 4,
Lines 61 and 64, change "falloff" to -- fall-off --.

Column 5,
Line 37, after "optical fiber 305", delete "and".
Line 42, after "306", delete "and".

Column 7,
Line 37, before "third", delete "a".

Signed and Sealed this

Twenty-seventh Day of December, 2005

JON W. DUDAS
*Director of the United States Patent and Trademark Office*